United States Patent [19]

Alvarez

[11] 4,062,110
[45] Dec. 13, 1977

[54] PORTABLE TOOL FOR STRIPPING METAL SHEATHING FROM HEAVY CONDUCTIVE CABLE

[76] Inventor: Marcelino N. Alvarez, 93-40 212 Pl., Hollis, N.Y. 11429

[21] Appl. No.: 702,190

[22] Filed: July 2, 1976

[51] Int. Cl.² .................. B21F 13/00; B26B 27/00
[52] U.S. Cl. ......................... 30/90.8; 30/90.3; 30/370
[58] Field of Search ............ 30/90.8, 90.3, 90.4, 30/370, 373

[56] References Cited

U.S. PATENT DOCUMENTS

| 590,163 | 9/1897 | Pearson | 30/370 |
|---|---|---|---|
| 995,971 | 6/1911 | Keyes | 30/370 |
| 1,316,252 | 9/1919 | Moering | 30/370 |
| 1,530,023 | 3/1925 | Walton | 30/370 |
| 1,757,531 | 5/1930 | Kinkela | 30/90.8 X |
| 2,084,488 | 6/1937 | Heller | 30/370 |
| 2,139,272 | 12/1938 | Jaworski | 30/370 |
| 2,344,262 | 3/1944 | Odierna et al. | 30/370 |
| 2,366,017 | 12/1944 | Fortune | 30/370 |
| 2,537,287 | 1/1951 | Thomas | 30/90.4 X |
| 2,559,387 | 7/1951 | Baker | 30/90.4 X |

Primary Examiner—Gary L. Smith
Assistant Examiner—J. T. Zatarga

[57] ABSTRACT

A portable tool for stripping metal sheathing from heavy conductive cable comprising a casing shaped to be manually held and having a rotatable drive shaft to which is secured a thin cutting wheel. A fixture is secured to the casing and carries a flange which projects therefrom, in turn carrying a guide extending transversely into proximity with and beyond the cutting wheel. The guide defines a passage in which the cutting wheel penetrates and the guide is relatively thin to penetrate between the outer metal sheathing of a cable and the inner resilient sheathing such that the outer metal sheathing will be cut by the cutting wheel while the guide travels over the inner sheathing. For this purpose, the guide has a small bend in approximate alignment with the axis of rotation of the drive shaft of the cutting wheel. The guide member can be in the form of a U-shaped element having parallel legs straddling the passage in which the cutting wheel extends.

10 Claims, 3 Drawing Figures

PORTABLE TOOL FOR STRIPPING METAL SHEATHING FROM HEAVY CONDUCTIVE CABLE

FIELD OF THE INVENTION

The invention relates to a portable tool for stripping metal sheathing from heavy conductive cable and particularly from cable carrying a plurality of conductors within an inner resilient sheathing surrounded by the outer metal sheathing.

BACKGROUND
PRIOR ART

Numerous tools for stripping metal sheathing from heavy conductive cable are known and it frequently becomes desirable to remove the metal sheathing from the cable when such sheathing is damaged and thereafter permitting the installation of a new metal sheathing.

In general, such tools are mounted in fixtures to which the cable is fed and guided. This involves the use of cumbersome drive means for the cable for advancing it through and beyond the fixture. Moreover, means must be provided to take up the stripped metal sheathing as it is being cut in the fixture. Also, such fixtures themselves are relatively large and complex and frequently come out of alignment requiring continued inspection and adjustment with frequent interruptions for resetting purposes. Additionally, it has been found that the cables themselves are so constructed that the sheathing has a twist therein such that when the outer metal sheathing is cut, the cable itself demonstrates a tendency to twist. This must be taken into account in the drive means which feeds the cable to and beyond the cutting fixture and the fixture itself must permit the cable to travel freely therethrough while the cable is supported with capability of undergoing angular travel.

A typical example of a fixture-mounted sheath removing machine is that in Baker U.S. Pat. No. 2,559,387. This machine employed a special pressure support for the cable and such support not only opposes axial advance of the cable but also angular twist there, whereby there is no compensation for the twisting of the cable when the metal sheathing is slit.

Another tool for cutting flexible conduit is that shown in U.S. Pat. No. 3,093,023 to Vail wherein a clamp secures the conduit in the tool and a cutting operation is effected on the clamped conduit. This, of course, limits the tool to a given length of conduit which can be cut and, hence, continuous cutting of the conduit is not possible.

A portable cutting tool is shown in U.S. Pat. No. 3,805,382 to Benedict, Jr. and herein the cutting principle is one of a pneumatic hammer type for slitting the outer sheath of a cable. A special guide acts in conjunction with the cutter which receives a series of reciprocating blows from a pneumatic air hammer. This tool is not capable of slitting heavy metal sheathing from a large diameter cable.

SUMMARY OF THE INVENTION

An object of the invention is to provide a portable tool for slitting metal sheathing from heavy conductive cable which avoids the disadvantages noted hereinabove with the prior art tools and which is particularly effective for continuous slitting of heavy metal sheathing.

More particularly, the invention contemplates the provision of a portable tool for stripping metal sheathing from heavy conductive cable, said tool comprising drive means including a casing shaped to be manually held and a rotatable drive shaft projecting from said casing, a fixture secured to said casing, a flange secured to said fixture and projecting therefrom substantially parallel to said drive shaft, a circular cutting wheel secured to said drive shaft for rotation therewith, and guide means secured to said flange and extending transversely therefrom into proximity with and beyond said cutting wheel, said guide means defining a passage therein in which said cutting wheel penetrates, said guide means being relatively thin for penetrating between an outer metal sheathing of a cable and an inner resilient sheathing for positioning said cutting wheel to cut said outer metal sheathing while guiding the cutting wheel over the inner sheathing and preventing cutting thereof, said guide means having a lower surface so disposed in relation to said cutting wheel such that the cutting wheel lies in entirety above said lower surface and cannot project therebeyond, said guide means extending substantially perpendicularly from said flange and having a small upward bend therein in approximate alignment with the axis of rotation of the drive shaft such that said guide means has a free end which is elevated to guide the outer sheathing to said cutting wheel in separated relation from said inner sheathing.

Preferably, the guide means is rounded at its free end and has a beveled lower surface thereat. This free end of the guide means extends beyond the cutting wheel.

The guide means can be in the form of a U-shaped member with legs constituted as circular rods.

The invention will become more clearly understood from the description to be given hereafter in relation to a specific embodiment.

DETAILED DESCRIPTION OF THE DRAWINGS

Figure 1:
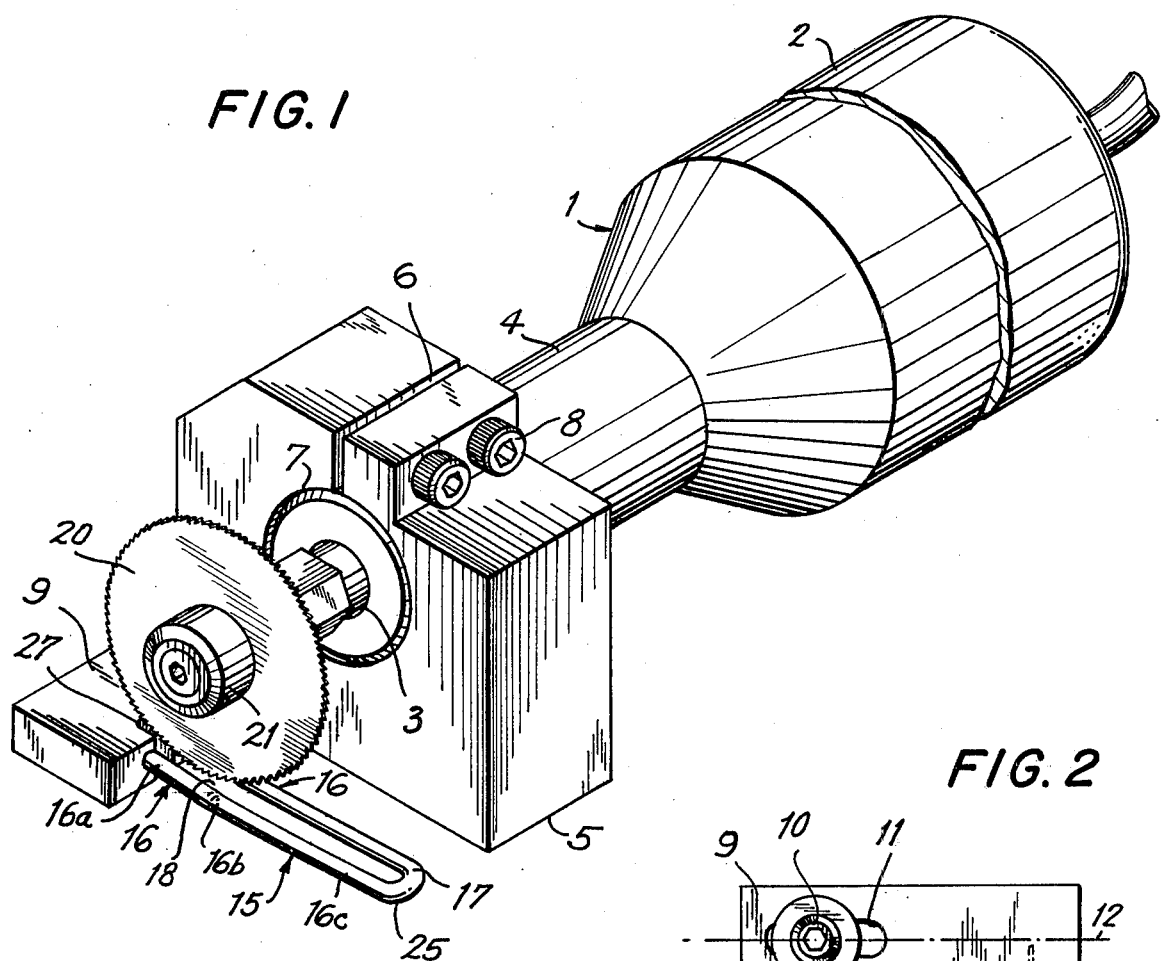
FIG. 1 is a perspective view of a portable tool for stipping metal sheathing according to the invention.

With reference to the drawing, therein is seen a portable power unit 1 having a casing portion 2 shaped to be manually held and containing a motor for driving a drive shaft 3. By way of example, the motor may have a rating of 24,000 rpm or thereabout.

The casing has a collar portion 4 on which is mounted a fixture 5 of a part of the cutting assembly according to the invention.

The fixture 5 is constituted by a housing block slit at 6 and having a bore 7 which is fitted on collar 4. Two screws 8 are employed for tightly clamping the fixture 5 onto the collar 4.

A flange or plate 9 is secured to fixture 5 by means of a bolt 10 which passes through a slot 11 in the flange and is threaded into a hole in fixture 5; thereby flange 9 can be adjusted to project a regulated amount from the fixture 5 along axis 12 passing through the slot 11 parellel to the axis of rotation of drive shaft 3.

Fixedly secured to the flange 9 is a guide 15. The guide is in the form of a U-shaped member having parellel legs 16 in the shape of round rods with a bight portion 17 forming a free rounded end at the extremity of guide 15. The legs 16 define a passage 18 therebetween entending transversely and perpendicular to the axis of the drive shaft and the axis 12 of slot 11.

Accommodated within the passage 18 is a thin cutting wheel 20. The cutting wheel is secured on a mandrel 21 which in turn is fixed to the drive shaft 3 of the drive motor so as to be driven in rotation thereby. For this purpose, the mandrel 21 is inserted into the collet of the casing 1 and tightly secured by nut 22 therein. Any suitable mounting means which can position the cutting wheel in the passage 18 of the guide 15 is suitable.

Figure 2:
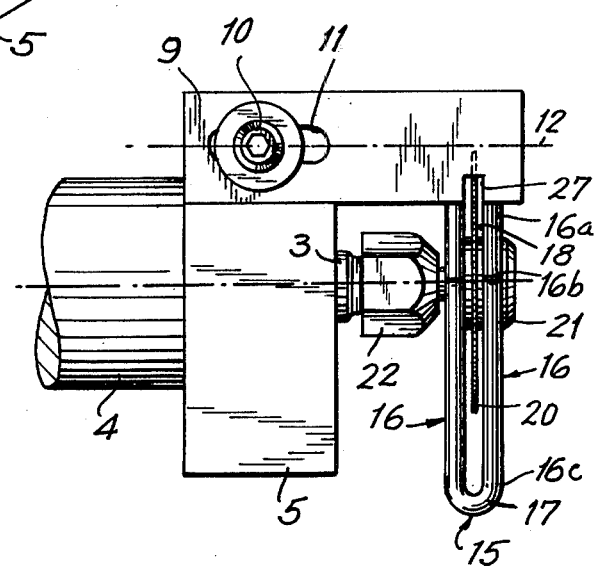
FIG. 2 is a bottom view of a portion of the tool of FIG. 1.
Figure 3:
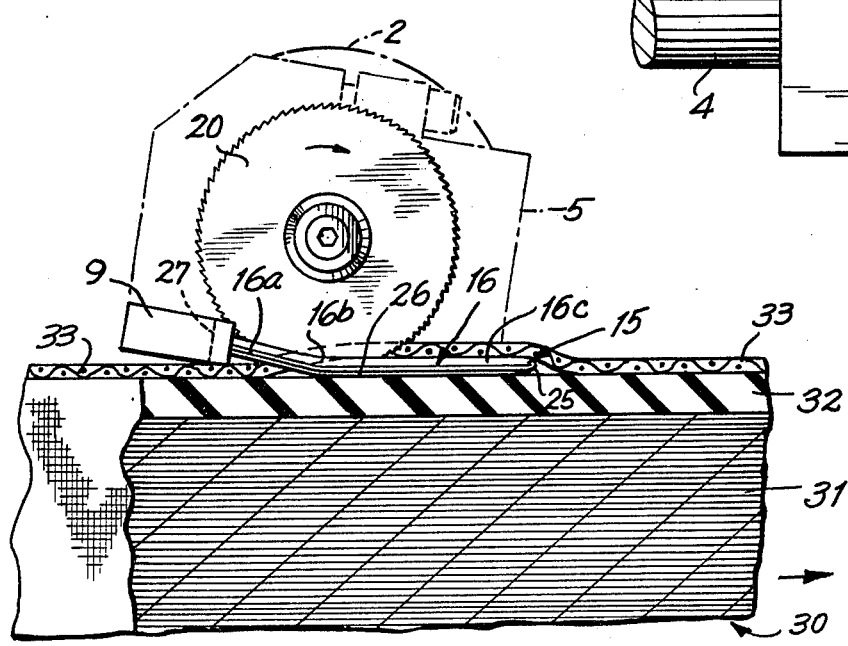
FIG. 3 is a view partly in section showing the manner in which the tool operates to strip the metal sheathing from a conductive cable.

As seen in FIGS. 1 and 3, each guide leg 16 has a portion 16a which extends perpendicularly from flange 9 and this is followed by a bend 16b from which an outer portion 16c extends. The bend forms an angle between portions 16a and 16c of about 6° to 20° for a purpose which will be evident hereafter. It is to be further noted that the bend 16b is disposed at a location on leg 16 such that a line drawn through bend 16b perpendicular to portion 16a will passs through the axis of rotation of drive shaft 3. This is critical to insure correct feed of the outer sheathing material of the cable to the tool as will be explained more fully later. For a guiding purpose also to be explained in detail later, the free end of the guide 15 has a lower beveled tip 25 and this free end has a rounded portion as afforded by bight 17 as can be seen in FIG. 2.

The positioning of the flange 9 with respect to the fixture 5 and the guide 15 with respect to the flange 9 is such that the cutting wheel 20 will extend into the passage 18 but not protrude from the bottom thereof. Stated otherwise, the cutting wheel 20 will be disposed in entirety above the lower surface 26 of the legs 16 of guide 15.

The adjustability of the flange 9 along axis 12 through slot 11 enables the cutting wheel to be positioned exactly in the center of the passage 18 whereby variations of mounting of the cutting wheel on the drive shaft can be accommodated. The flange 9 is slotted at 27 in alignment with passage 18 to receive cutting wheel 20 with substantial clearance.

The tool is intended for the purpose of stripping metal sheathing from heavy conductive cable of the type shown at 30 in FIG. 3, said cable consisting of a plurality of individual conductors 31 covered by a heavy rubber or plastic inner sheathing 32 and in turn covered by an outer braided metallic sheathing 33. The tool is intended for slitting the outer metal sheathing 33 without damaging the inner sheathing 32 such that after the outer sheathing 33 has been stripped from the cable, the latter can now be recovered by a new metal sheathing.

As can be seen in FIG. 3, the cutting wheel is driven in clock-wise direction and the portable tool is manually held and urged towards the right in the direction of the arrow. The guide 15 is placed beneath the outer metal sheathing 33 and the portion 16c rests on the outer surface of the inner sheathing 32. By virtue of the bend 16b, the weight of the operator can be inclined forwardly to aid in the manual travel of the cutting tool along the cable. Additionally, due to the bend 16b of the guide, the slit sheathing 33 passes rearwardly and avoids contact with the lower right corner of the flange 9 whereby there is no interference to forward travel of the tool and relatively slight resistance thereto. The free extremity of the guide, which extends beyond the circumference of the cutting wheel, facilitates its penetration between outer sheath 33 and inner sheath 32 while feeding the outer sheath over the guide toward the cutting wheel by virture of the beveled tip 25 and the rounded bight portion 17, while preventing any jamming or snagging of the braided metal outer sheathing.

For use by left and right handed persons, the flange 5 is either placed in the position shown or in reverse position and separate guides, secured to respective flanges, are employed for left and right hand use.

In operation, it has been found that as the tool is advanced along the cable and the outer sheathing is stripped therefrom, the inner cable relaxes and freely twists to compensate for the inherent twist which is imposed when the metal sheathing is braided onto the cable. Thus, no compensation means whatsoever are necessary and the operator merely advances along what appears to be a straight axial line through the center of the cable.

Although the invention has been described hereinabove in relation to a specific embodiment thereof, it will become apparent to those skilled in the art that numerous modifications and variations can be made within the spirit and scope of the invention as defined in the appended claims.

What is claimed is:

1. A portable tool for stripping metal sheathing from heavy conductive cable, said tool comprising drive means including a casing shaped to be manually held and a rotatable drive shaft projecting from said casing, a fixture secured to said casing, a flange in the form of a plate secured to said fixture and projecting therefrom substantially parallel to said drive shaft, a circular cutting wheel secured to said drive shaft for rotation therewith, and guide means secured to said flange and extending transversely therefrom into proximity with said cutting wheel, said guide means being elongated and projecting to a point beyond said cutting wheel, said guide means defining a passage therein in which said cutting wheel penetrates, said guide means being relatively thin for penetrating between an outer metal sheathing of a cable and an inner resilient sheathing for positioning said cutting wheel to cut said outer metal sheathing while guiding the cutting wheel over the inner sheathing and preventing cutting thereof, said guide means having a lower surface so disposed in relation to said cutting wheel such that the cutting wheel lies in entirety above said lower surface and cannot project therebeyond, said guide means extending substantially perpendicularly from said flange and having a small upward bend therein at an intermediate location along the length thereof to form inner and outer portions on opposite sides of said bend, said bend being disposed along said guide means in a plane extending substantially perpendicular to said guide means and passing substantially through the axis of rotation of the drive shaft such that said guide means has a free end which is elevated with respect to said inner portion of the guide means to guide the outer sheathing to said cutting wheel in separated relation from said inner sheathing and to position said flange at a raised level above said outer sheathing.

2. A tool as claimed in claim 1 wherein said guide means has a beveled lower surface at said free end.

3. A tool as claimed in claim 2 wherein said guide means is rounded at said free end.

4. A tool as claimed in claim 1 wherein said passage is relatively narrow and extends perpendicularly to said axis of rotation of said cutting wheel.

5. A tool as claimed in claim 1 wherein said bend forms an angle between 6° and 20° between said inner and outer portions of the guide means.

6. A tool as claimed in claim 1 wherein said guide means includes two flank portions straddling said passage, said flank portions merging at said free end.

7. A tool as claimed in claim 6 wherein said flank portions are legs joined at said free end.

8. A tool as claimed in claim 7 wherein said legs are constituted as rods of circular cross-section.

9. A tool as claimed in claim 7 wherein said legs are joined by a bight portion at said free end to form a U-shaped member.

10. A tool as claimed in claim 1 wherein the plane passing through the bend and the axis of rotation of said shaft is perpendicular to said inner portion of the guide means.

* * * * *